United States Patent [19]

Tanaka

[11] Patent Number: 4,858,018

[45] Date of Patent: Aug. 15, 1989

[54] IMAGE PROCESSING APPARATUS

[75] Inventor: Hiroshi Tanaka, Iwatsuki, Japan

[73] Assignee: Fuji Xerox Co., Ltd., Japan

[21] Appl. No.: 174,591

[22] Filed: May 29, 1988

[30] Foreign Application Priority Data

Jun. 24, 1987 [JP] Japan ................. 62-157086

[51] Int. Cl.$^4$ ............................................. H04N 1/40
[52] U.S. Cl. .................................. 358/456; 358/443; 358/464
[58] Field of Search ..................... 358/280, 282, 283

[56] References Cited

U.S. PATENT DOCUMENTS

| | | | |
|---|---|---|---|
| 4,238,768 | 12/1980 | Mitsuya et al. | 358/283 |
| 4,701,808 | 10/1987 | Nagashima | 358/283 |
| 4,710,822 | 12/1987 | Matsunawa | 358/280 |
| 4,722,008 | 1/1988 | Ibaraki et al. | 358/282 |
| 4,725,892 | 2/1988 | Suzuki et al. | 358/280 |
| 4,758,897 | 7/1988 | Hiratsuka et al. | 358/283 |
| 4,766,499 | 8/1988 | Inuzuka | 358/282 |
| 4,783,838 | 11/1988 | Matsunawa | 358/283 |
| 4,788,598 | 11/1988 | Ochi et al. | 358/283 |
| 4,803,558 | 2/1989 | Hiratsuka et al. | 358/283 |

FOREIGN PATENT DOCUMENTS 62-25388   2/1987   Japan .
62-43263   2/1987   Japan .

Primary Examiner—Howard W. Britton
Assistant Examiner—Kim Yen Vu
Attorney, Agent, or Firm—Welsh & Katz, Ltd.

[57] ABSTRACT

In an image processing apparatus disclosed, an image evaluation means divides an original image data into the number of blocks as based on a reduction rate, and evaluates the image data of each block to determine evaluation values. The image determining means compares the evaluation value of each block with the threshold value preset for each block, to determine if the reduced image of each block is set to black or white. An executing means causes the image evaluation means and the image determining means to execute their processings the number of times as based on a reduction rate.

14 Claims, 3 Drawing Sheets

IMAGE PROCESSING APPARATUS

This invention relates to an image processing apparatus for converting an original image into an image whose size is a factor of integer of the original image size.

BACKGROUND OF THE INVENTION

Heretofore, in this type of the image processing apparatus, an image with a gradation, such as photograph, is dither processed into 2-level image data of black and white. The image data are stored into image files, for example. A number of dots allowed for displaying on the CRT display is much smaller than that of the original image. For obtaining an appropriate display of the original image on the CRT display, therefore, the original image must be reduced in size.

The method to reduce the dither processed original image, which has been most widely employed, is to thin out the dots of the original image according to a reduction rate.

When this method to simply thin out the dots of the original image is applied to the size reduction of the original image, the dither structure of the original image is distorted, so that a resemblance between the reduced image and the original image is greatly damaged and one cannot recognize the original image when seeing the displayed image. In this respect, this thin-out method has been impractical in use.

SUMMARY OF THE INVENTION

This invention provides an image processing apparatus which can size reduce an original image without deteriorating the picture quality. In this apparatus, a central processing unit (CPU) divides the original image data into blocks of a predetermined number of lines according to a reduction rate. The divided original image data containing the predetermined number of lines are stored in a line memory. An evaluation table has stored predetermined evaluation values corresponding to the original image data in each block output from the line memory. An adder adds together the evaluation values output from the evaluation table to the addition results of the adder output from a latch circuit, to obtain a total sum of the evaluation values for each block. The total sum is output to a comparator. A threshold table has stored, for each block, predetermined threshold values to determine if the reduced image of each block is set to white or black. A sequence controller reads out the threshold values predetermined for each block from the threshold table, and outputs to the comparator. The comparator compares the total sum of the fetched evaluation values of the blocks with the threshold values, to determine if the reduced image of each block is set to white or black. The CPU causes the execution of the image processing the number of times according to a reduction rate, to reduce the original image into an image which is reduced by a factor of integer of the original image size.

Accordingly, an object of this invention is to provide an image processing apparatus which can reduce the original image without damaging its picture quality.

Another object of this invention is to provide an image processing apparatus which enables the original image to be reduced and the density of the reduced image to be adjusted, for two-level image data.

Other objects, features and advantages of this invention will be apparent when carefully reading the detailed description given hereinafter in connection with the accompanying drawings.

DETAILED DESCRIPTION OF THE PREFERRED EMBODIMENT

Figure 1:
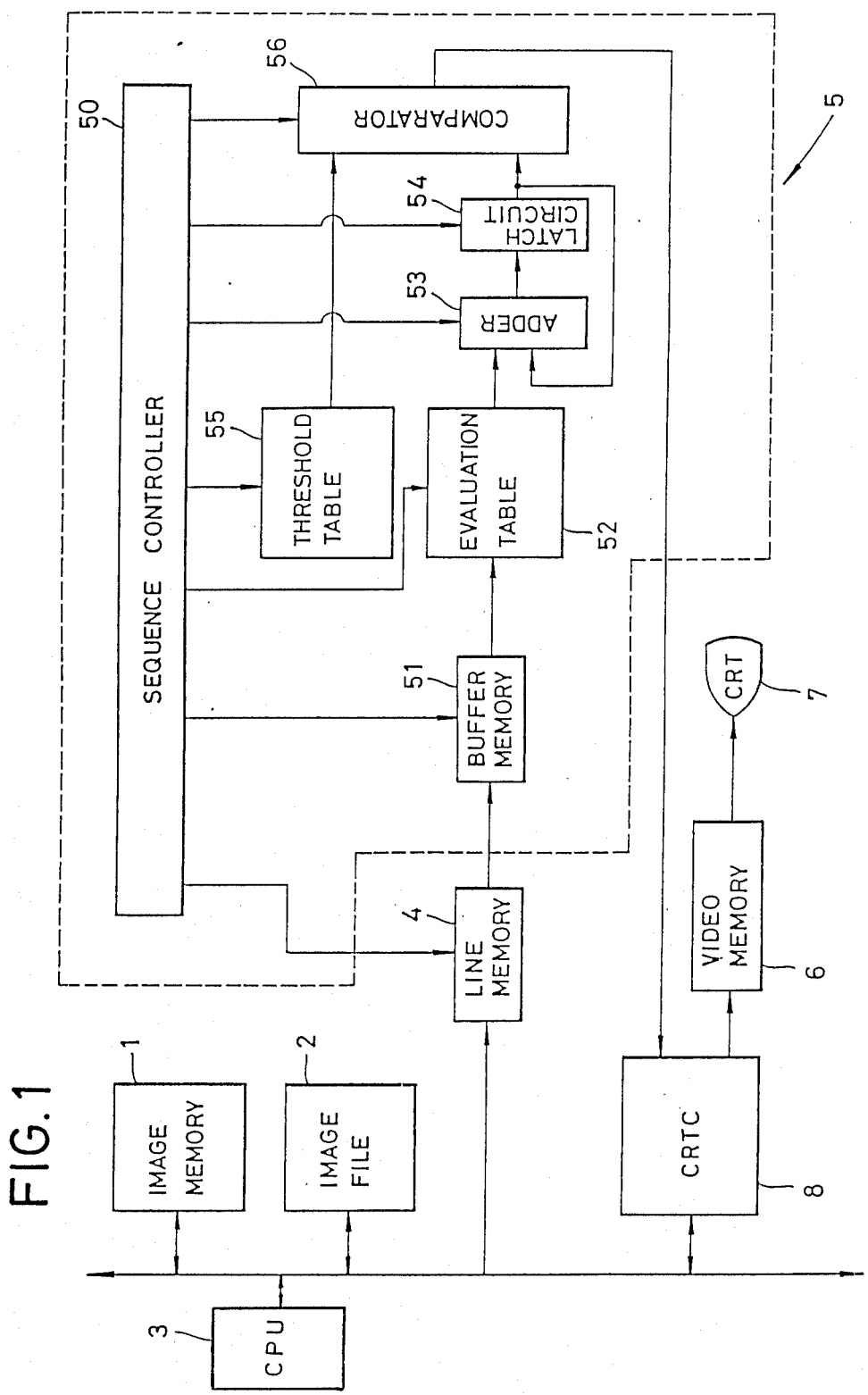
FIG. 1 is a block diagram showing an embodiment of an image processing apparatus according to this invention.

FIG. 1 shows a block diagram of an image processing apparatus according to an embodiment of this invention. In the figure, an image memory 1 and an image file 2 store the data of an original image. A central processing unit (CPU) 3 controls the read and write operation of the image data to and from the image memory 1 or the image file 2. The CPU 3 controls the read operation of the original image according to a reduction rate of the original image. To size reduce the original image to a 1/K image for both the directions of horizontal and vertical, the CPU 3 reads out the original image data of K lines (one line corresponds to one line of the original image) from the image memory 1 or the image file 2. A line memory 4 stores the read out data of the original image. An image processing unit 5 as a major part of this invention reads out the original image data from the line memory 4, executes the image processing, and stores the resultant reduced image data in a video memory 6, and reads out the same from the video memory 6 in synchronism with the raster scan (not shown) of a CRT display 7. A CRT controller (CRTC) 8 fetches the reduced image data as read out of the video memory 6, and displays it on the CRT display 7.

The image processing unit 5 constituting an essential part of this invention is comprised of a sequence controller 50, a buffer memory 51, an evaluation table 52, an adder 53, a latch circuit 54, a threshold table 55, and a comparator 56. The sequence controller 50 controls a sequence of the image reduction processing. The buffer memory 51 stores the original image data of one block when the original image as read out from the line memory 4 by the sequence controller 50 is divided into blocks according to a reduction rate. The evaluation table 52 receives the one-block original data D of one line as the address data, and outputs evaluation values "g" as preset corresponding to the received address data of each line. The adder 53 adds together the evaluation values "g" output from the evaluation table 52, and obtains the total sum of the evaluation values of one block as obtained by dividing the original image data according to a reduction rate. The latch circuit 54 temporarily stores the addition result and returns the addition result to the adder 53 for the next addition. The threshold table 55 stores threshold values to determine if the image of that one block is set to white or black. The comparator 56 compares the threshold value output from the threshold table 55 with the total sum of the evaluation values of each block, and sets the image data of that block to white or black.

Figure 2:
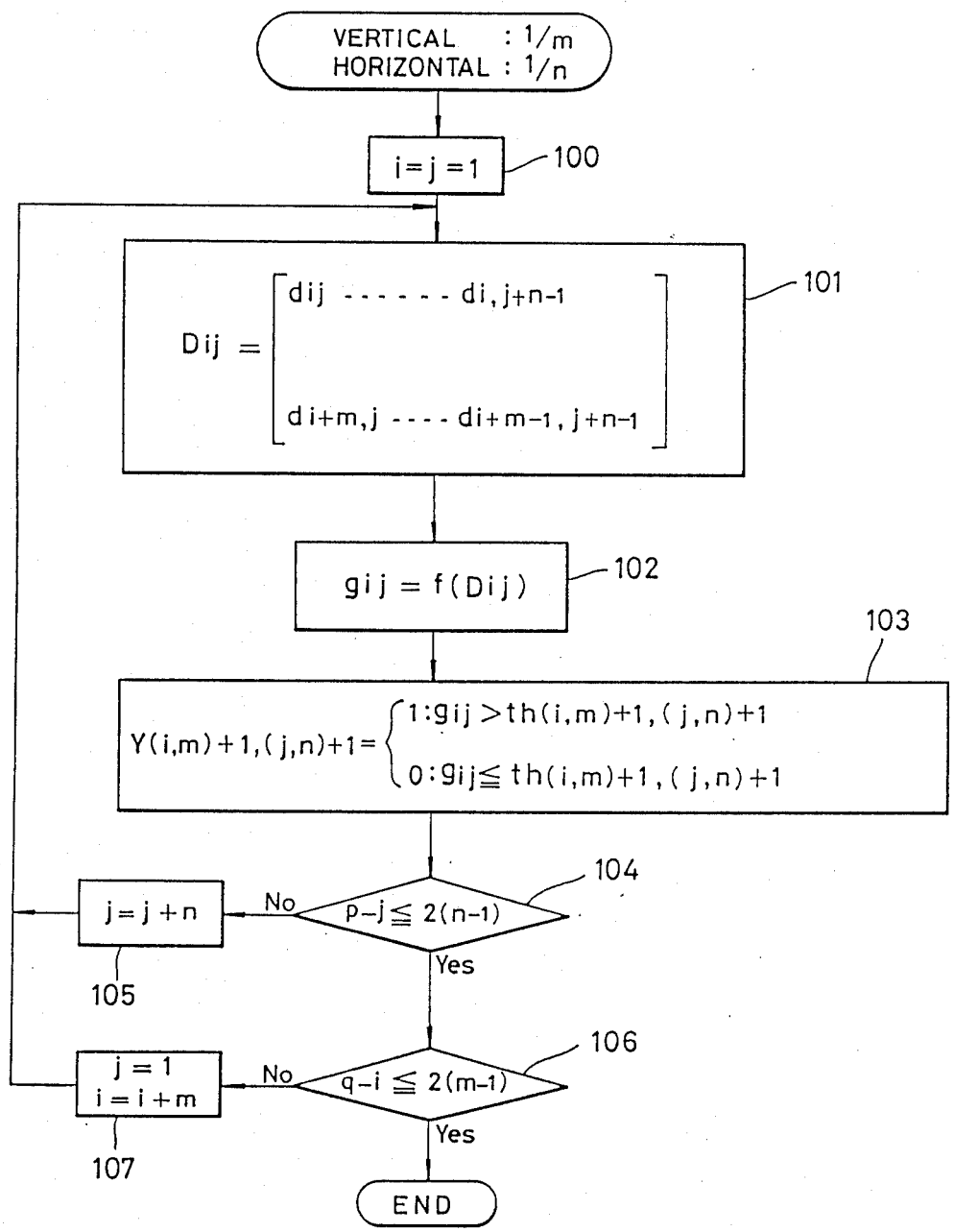
FIG. 2 is a flowchart illustrating a flow of image processing by the image processing unit shown in FIG. 1.

FIG. 2 shows a flowchart showing a flow of the image reduction processing by the image processing unit 5.

Figure 3A:
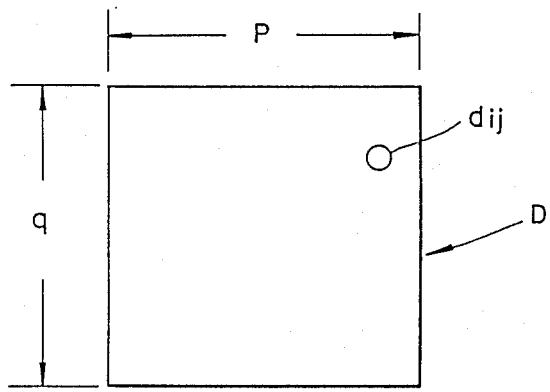
FIG. 3 shows views showing a relationship between the original image and the reduced image.
Figure 3B:
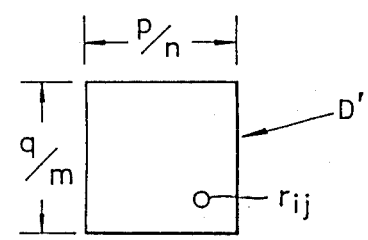

The original image D consists of q (vertical)×p (horizontal) dots, as shown in FIG. 3(a). One dot of the q×p matrix is mathematically expressed by $d_{ij}$ where $1 \leq i \leq q$, and $1 \leq j \leq p$. The original image D of q×p dots is converted into a reduced image D' of q/m (vertical)×p/n (horizontal) bits, viz., reduced into an image of a factor of m×n, as shown in FIG. 3(b). Here, m is the number of lines of the original image and n is the number of blocks dividing the original image. One of the dots constituting the reduced image D' is expressed by $r_{ij}$.

To begin with, to reduce the original image, the data of m lines of the original image of m×p dots from the image memory 1 or the image file 2, are transferred to the line memory 4 and stored thereinto.

For simplicity of explanation, it is assumed that p=q=16 and m=n=4. Hence, the original image D of 16×16 dots is reduced into the reduced image D' of 4×4 dots. The original image data of 4 lines, which is expressed by the following matrix, are transferred to the line memory 4 and stored therein.

$$D = \begin{bmatrix} d_{1,1} d_{1,2} d_{1,3} \ldots d_{1,16} \\ d_{2,1} d_{2,2} d_{2,3} \ldots d_{2,16} \\ \cdot \qquad \cdot \\ \cdot \qquad \cdot \\ \cdot \qquad \cdot \\ d_{4,1} d_{4,2} d_{4,3} \quad d_{4,16} \end{bmatrix} \quad (1)$$

The sequence controller 50 places the parameters i and j to 1, i.e., i=j=1 (step 100), in order to divide the original data of 4 lines into n block, viz four blocks for the image processing, and stores the original image $D_{ij}$ as given by the next matrix in the buffer memory 51. More specifically, of the original image of 4 lines given by the formula (1), the original image $D_{11}$ of the first block as given by the following formula (2) are stored into the buffer memory 51 (step 101).

$$D_{11} = \begin{bmatrix} d_{1,1} d_{1,2} d_{1,3} d_{1,4} \\ d_{2,1} d_{2,2} d_{2,3} d_{2,4} \\ \cdot \qquad \cdot \\ \cdot \qquad \cdot \\ \cdot \qquad \cdot \\ d_{4,1} d_{4,2} d_{4,3} d_{4,4} \end{bmatrix} \quad (2)$$

Subsequently, the sequence controller 50 transfers the image data of the formula (2) as units of lines to the address input of the evaluation table 52, in order to evaluate or check if the original image $D_{11}$ is more weighted black than white.

Assuming that an evaluation function of the original image $D_{ij}$ is $f(D_{ij})$, and its evaluation value is $g_{ij}$, the threshold value $g_{ij}$ is the sum of the products of weighting coefficients which are different for each dot of the original image of i×j dots, as given by the following formula (3). Incidentally, the weighting coefficients are referred to here by way of example.

$$g_{ij} = 1 \cdot d_{i,j} + 2 \cdot d_{i,j+1} + 2 \cdot d_{i,j+2} + 1 \cdot d_{i,j+3} + 2 \cdot d_{i+1,j} + \quad (3)$$
$$3 \cdot d_{i+1,j+1} + 3 \cdot d_{i+1,j+2} + 2 \cdot d_{i+1,j+3} + 2 \cdot d_{i+2,j} + 3 \cdot$$
$$d_{i+2,j+1} + 3 \cdot d_{i+2,j+2} + 2 \cdot d_{i+2,j+3} + 1 \cdot d_{i+3,j} + 2 \cdot$$
$$d_{i+3,j+1} + 2 \cdot d_{i+3,j+2} + 1 \cdot d_{i+3,j+3}$$

From the above formula, the evaluation value $g_{11}=f(D_{11})$ when i=j=1 is given by $$g_{11} = 1 \cdot d_{1,1} + 2 \cdot d_{1,2} + 2 \cdot d_{1,3} + 1 \cdot d_{1,4} + 2 \cdot d_{2,1} + \ldots + \quad (4)$$
$$2 \cdot d_{3,1} + \ldots + 1 \cdot d_{4,1} + \ldots + 1 \cdot d_{4,4}$$

The evaluation value $g_{ij}$ can be obtained by the multiplying operation, but if the multiplying operation is performed every time the parameters are changed, the processing speed is slowed.

To avoid this, in this embodiment, the evaluation values of one line in one block $D_{ij}$ are previously calculated according to the combination of black and white of the one-line image data, and are stored in the evaluation table 52. After the original image $D_{ij}$ of one block is stored in the buffer memory 51, the image data of each line of the original data $D_{ij}$ are input as units of lines to the evaluation table 3, and the evaluation values are read out from the table for each line, and are added by a combination of the adder 53 and the latch 54. Finally, the evaluation value $g_{ij}$ of one block is obtained.

When the evaluation function shown by the formula (3) is used, the evaluation values defined as shown in Table 1 are stored in the evaluation table 52.

TABLE 1

| DATA | LINE | | | | |
|------|----|----|----|----|----|
|      | 00 | 01 | 10 | 11 | |
| 0 0 0 0 | 0 | 0 | 0 | 0 | EVALUATION VALUE |
| 0 0 0 1 | 1 | 2 | 2 | 1 | |
| 0 0 1 0 | 2 | 3 | 3 | 2 | |
| 0 0 1 1 | 3 | 5 | 5 | 3 | |
| 0 1 0 0 | 2 | 3 | 3 | 2 | |
| 0 1 0 1 | 3 | 5 | 5 | 3 | |
| 0 1 1 0 | 4 | 6 | 6 | 4 | |
| 0 1 1 1 | 5 | 8 | 8 | 5 | |
| 1 0 0 0 | 1 | 2 | 2 | 1 | |
| 1 0 0 1 | 2 | 4 | 4 | 2 | |
| 1 0 1 0 | 3 | 5 | 5 | 3 | |
| 1 0 1 1 | 4 | 7 | 7 | 4 | |
| 1 1 0 0 | 3 | 5 | 5 | 3 | |
| 1 1 0 1 | 4 | 7 | 7 | 4 | |
| 1 1 1 0 | 5 | 8 | 8 | 5 | |
| 1 1 1 1 | 6 | 10 | 10 | 6 | |

In the above table, the "line" indicates a row in the matrix of the block $D_{ij}$, and the "data" is a data pattern of all of the elements "d" in the block $D_{ij}$ in that row.

After the evaluation value $g_{11}$ of the first block is output from the latch circuit 54 (step 102), the sequence controller 50 inputs this evaluation value $g_{11}$ to the comparator 56, and compares it with predetermined threshold value in the threshold table 55. The predetermined values "t" preset in the threshold table 55 are expressed by a v×w matrix as given by the following formula (5)

$$t = \begin{bmatrix} t_{11} \ldots t_{1w} \\ \cdot \qquad \cdot \\ \cdot \qquad \cdot \\ \cdot \qquad \cdot \\ t_{v1} \ldots t_{vw} \end{bmatrix} \quad (5)$$

If v=w=3, for example, we have $$t = \begin{bmatrix} t_{11} & \ldots & t_{13} \\ \vdots & & \vdots \\ t_{31} & \ldots & t_{33} \end{bmatrix} \quad (6)$$

The sequence controller 50 selects a threshold value out of the threshold values "t" of v×w according to the logic expressed in the following formula (7), in order that the threshold values "t" become different for each block Dij of the original image data, and inputs the selected threshold value into the comparator 56.

$$th_{ij} = t_{mod(i-1, v)+1, \, mod(j, w)+1} \quad (7)$$

where mod(i−1, v) indicates the remainder of (i−1)/v, and $th_{ij}$ indicates an element of the matrix "t".

When v=w=3, the threshold value $th_{11}$ selected for the block of i=j−1 is $$\begin{aligned} th_{11} &= t_{mod(1-1,3)+1, \, mod(1-1,3)+1} \\ &= t_{11} \end{aligned} \quad (8)$$

The threshold value $t_{11}$ in the threshold matrix as given by the formula (6) is selected as the threshold value $th_{11}$ for i=j=1.

The comparator 56 determines one dot of the reduced image for the block of i=j=1 by using the following formula.

$$r_{(i,j)+1,(j,n)+1} = \begin{bmatrix} 1: g_{ij} > th_{(i,m)+1,(j,n)+1} \\ 0: g_{ij} \leq th_{(i,m)+1,(j,n)+1} \end{bmatrix} \quad (9)$$

where (i, m) indicates a maximum integer not more than i/m.

When the evaluation value $g_{11}$ in the block of i=j=1 is more than $th_{11}$, i.e., $g_{11} > th_{11}$, the comparator 56 determines that black is more weighted in this image data. This is made on the basis of the logic given by the formula (9). Then, the comparator 56 produces the data of logic "1". In the reverse case, the comparator 56 determines that white is more weighted, and produces the data of logic "0". In this way, the first dot in the first line of the reduced image D' is determined to be weighted black when $g_{11} > th_{11}$, and to be weighted white for $g_{11} \leq th_{11}$.

The above processing by the comparator 56 is executed in the step 103 in FIG. 2.

In this way, the reduced image of the first block is determined, and the sequence controller 50 checks if p−j≦(n−1) is satisfied, in order to proceed to the image reduction process of the next block. Specifically, the controller 50 checks if "j" indicates the dot in the final block in the horizontal direction (step 104), and when it does not indicate it yet, the controller 50 updates the parameter "j" to j=j+n (step 105).

With p=q=16, and m=n=4 as in the above instance, when the image processing of the first block has been completed, p−j≦2(n−1)→16−1≦2(4−1)→15≦6. Hence,
j=1+4=5.

Under this condition, the sequence controller 50 reads out from the buffer memory 51, the image data of the original image $D_{15}$ (i=1 and j=5) as given by $$D_{15} = \begin{bmatrix} d_{15}d_{16}d_{17}d_{18} \\ \vdots & \vdots \\ d_{45}d_{46}d_{47}d_{48} \end{bmatrix}, \quad (10)$$

and enables the processing ranging from the step 101 to the step 103 to be executed. An evaluation value $g_{15}$ for i=1 and j=5 is $$g_{15} = 1 \cdot d_{15} + 2 d_{16} + \ldots + 2 d_{47} + 1 \cdot d_{48}. \quad (11)$$

Under this condition, a threshold value $th_{12}$ is $$th_{12} = t_{mod(1-1,3)+1, \, mod(2-1,3)+1} = t_{12}. \quad (12)$$

Then, a reduced picture cell $r_{12}$ is given by $$r_{12} = \begin{bmatrix} 1: g_{15} > t_{12} \\ 0: g_{15} \leq t_{12} \end{bmatrix}. \quad (13)$$

Following the processing of the second block, the sequence controller 50 checks again if p−j≦2(n−1) is satisfied. The result of this check is 11≦6, and therefore, in step 105 the parameter "j" is updated to j=5+4=9. Then, the image processing unit starts the execution of the image processing of the image data of the block as designated by i=1 and j=9.

In this way, the blocks horizontally arranged are progressively image processed, and when the final block has been processed, p−j≦2(n−1) is p−j≦2(n−1)→16−13≦2(4−1)→3≦6. Then, a step 106 is executed. In this step, the sequence controller 50 checks if all of the blocks vertically arranged have been image processed, by using q−i≦2(m−1).

If the processes have not been completed, the sequence controller 50 updates the parameters "j" and "i" to j=1 and i=i+m. At the stage that the dots $r_{11}$ to $r_{14}$ of the reduced image have been processed, j=1 and i=1+4=5. Then, the original image data $D_{15}$ of the block as designated by j=1 and i=5 is read out from the buffer memory 51, and the image data processing from the step 101 to the step 103 are executed.

In this way, the image data processing from the step 101 to the step 103 are executed the number of times (16 times when m=n=4) according to a reduction rate, to obtain the reduced image of a total of 16 dots, as given below.

$$D' = \begin{bmatrix} r_{11}r_{12}r_{13}r_{14} \\ r_{21}r_{22}r_{23}r_{24} \\ r_{31}r_{32}r_{33}r_{34} \\ r_{41}r_{42}r_{43}r_{44} \end{bmatrix} \quad (14)$$

The threshold values "t" used for generating the dots of the reduced image, respectively, correspond to these dots, as shown below.

$$t = \begin{bmatrix} t_{11}t_{12}t_{13}t_{11} \\ t_{21}t_{22}t_{23}t_{21} \\ t_{31}t_{32}t_{33}t_{31} \\ t_{11}t_{12}t_{13}t_{11} \end{bmatrix} \quad (15)$$

The reduced image D' thus obtained is written into the video memory 6 under control of the CRTC 8, and then read out in synchronism with the raster scan of the CRT display 7, and finally displayed on the screen of the CRT display 7.

Some specific examples of the original image $D_{ij}$ and the evaluation value $g_{ij}$ when $p = q = 16$ and $m = n = 4$ will be given below, for reference.

When $i = j = 1$: (a)

$$D_{11} = \begin{bmatrix} d_{11} \ldots d_{14} \\ \vdots \quad \vdots \\ d_{41} \ldots d_{44} \end{bmatrix}$$

$g_{11} = 1 \cdot d_{11} + \ldots + 1 \cdot d_{44}$
$r_{(i,m)+1,(j,n)+1} = r_{11}$
$t_{mod(i-1,v)+1,mod(j-1,w)+1} = t_{11}$ When $i = 1$, and $j = 5$: (b)

$$D_{15} = \begin{bmatrix} d_{15} \ldots d_{18} \\ \vdots \quad \vdots \\ d_{45} \ldots d_{48} \end{bmatrix}$$

$g_{15} = 1 \cdot d_{15} + \ldots + 1 \cdot d_{48}$
$r_{(i,m)+1,(j,n)+1} = r_{12}$
$t_{mod(i-1,v)+1,mod(j-1,w)+1} = t_{12}$ When $i = 1$, and $j = 13$: (c)

$$D_{1,13} = \begin{bmatrix} d_{1,13} \ldots d_{1,16} \\ \vdots \quad \vdots \\ d_{4,13} \ldots d_{4,16} \end{bmatrix}$$

$g_{1,13} = 1 \cdot d_{1,13} + \ldots + 1 \cdot d_{4,16}$
$r_{(i,m)+1,(j,n)+1} = r_{14}$
$t_{mod(i-1,v)+1,mod(j-1,w)+1} = t_{11}$ When $i = 5$ and $j = 5$: (d)

$$D_{55} = \begin{bmatrix} d_{55} \ldots d_{58} \\ \vdots \quad \vdots \\ d_{85} \ldots d_{88} \end{bmatrix}$$

$g_{55} = 1 \cdot d_{55} + \ldots + 1 \cdot d_{88}$
$r_{(i,m)+1,(j,n)+1} = r_{22}$
$t_{mod(i-1,v)+1,mod(j-1,w)+1} = t_{22}$ As seen from the foregoing description, in this invention, the original image D is divided into blocks according to a reduction rate. The evaluation value $g_{ij}$ for evaluating the image of each block is worked out. The evaluation value $g_{ij}$ is compared with the threshold value $th_{ij}$, thereby to obtain the reduced image D'.

As seen from the formula (15), the threshold value $g_{ij}$ takes a different value when the block is changed. Therefore, the reduced image D' also takes the dither structure. Therefore, the image processing apparatus can produce the reduced image with the dither structure whose graduation is exactly the same as that of the original image.

In this case, if the threshold values $t_{11}$ to $t_{vw}$ of the $v \times w$ matrix shown by the formula (5) are all set to be the same values, we have a reduced image as obtained by simply two-level digitizing the original image. A density of the reduced image is also varied by appropriately selecting the threshold values. In other words, by varying the contents in the threshold table 55 in the image processing unit 5, the reduced image of the dither structure and the simple two-level image can be obtained, and further a density of the simple two-level image can also be varied.

As described above, the original image may be the image with the dither structure or the simple two-level image. The evaluation values of the original image are obtained by weighting the dots of the original image, and adding them together. If necessary, any other evaluation method may be employed if it can extract the features of the original image.

EFFECTS OF THE INVENTION

As seen from the foregoing description, an image processing apparatus according to this invention can obtain a reduced image with exactly the same picture quality as that of the original image. Additionally, the reduced image with the dither structure and the simple two-level image can be formed by a single image processing system, by appropriately selecting the threshold values. A density of the reduced image may be varied by varying the threshold values.

While the invention has been described using one specific embodiment, it should be understood that this invention may variously be changed and modified within the scope of this invention, and further this invention should be interpreted on the basis of the scope of the claims to be given later, and is not limited by the description in the specification any way. Further, it should be understood that modifications and alters within the equivalent of the wording of the claims are within the spirit and scope of this invention.

What is claimed is:

1. An image processing apparatus for converting image data of an original image made up of a plurality of dots into image data of an image which has been reduced by a desired factor in a vertical direction and which has been reduced by a desired factor in a horizontal direction, comprising:

image evaluation means for dividing the original image data into a plurality of blocks arranged in a matrix whose number depends on the desired reductions in the vertical and horizontal directions of the original image, and for evaluating the image data of each of said blocks to determine evaluation values;

image determining means for determining whether the reduced image of each of said blocks is set to white or black by comparing the evaluation values of each of said blocks with threshold values set corresponding to each of said blocks said threshold values arranged in a matrix with the number of rows and columns equal to the number of rows and columns in the reduced image data matrix; and executing means for executing the processing by said image evaluation means and said image determining means repeatedly for each of said blocks divided in accordance with the reduction factor so as to execute the processing of the reduced image for each of said blocks.

2. The image processing means according to claim 1, in which said evaluation values are products of the original image data made up of a plurality of dots constituting each of the blocks, by predetermined coefficients which are different dot by dot.

3. The image processing apparatus according to claim 1 in which each of said threshold values in the matrix is set to be different from each other threshold value in the matrix, resulting in each block in the reduced image corresponding to a different threshold value.

4. The image processing apparatus according to claim 1 in which said image evaluation means includes a control means for dividing the original image data into said plurality of blocks whose number depends on said reduction factor, a memory means for storing the original image data of said blocks, and an image evaluation means for evaluating the original image data of said blocks as read out from said memory means to determine evaluation values.

5. The image processing apparatus according to claim 4 in which said control means includes a central processing means for dividing the original image data so that each divided image data comprises lines whose number depends on said reduction factor in the vertical direction of the original image and a sequence controller for dividing the original image data divided by said central processing means into said blocks depending on said reduction factor in the horizontal direction of the original image.

6. The image processing apparatus according to claim 4 in which said memory means includes a line memory for storing the original image data of each line as divided by said central processing means for a predetermined number of lines and a buffer memory for storing the original image data of each block as divided by said sequence controller.

7. The image processing apparatus according to claim 4 in which said image evaluation means includes an evaluation table for outputting evaluation values preset for the image of each block, an adding means for obtaining the total sum of the evaluation values of each block by adding each evaluation value output from said evaluation table, and a latch circuit for outputting the result of addition of said adding means.

8. The image processing apparatus according to claim 7 in which said evaluation table receives the address of the original image data of each line in said blocks, and outputs an evaluation value preset corresponding to the address data of each line.

9. The image processing apparatus according to claim 1 in which said image determining means includes a memory means for storing threshold values determined for each of said blocks, a control means for reading out said threshold values from said memory means and a comparing means for comparing said evaluation values with said threshold values.

10. The image processing apparatus according to claim 9 in which said memory means includes a threshold table for storing predetermined threshold values for each of said blocks to determine whether the reduced image of each of said blocks is set to white or black.

11. The image processing apparatus according to claim 9 in which said control means includes a sequence controller for reading out the threshold value corresponding to each of said blocks from said threshold table.

12. The image processing apparatus according to claim 9 in which said comparing means includes a comparator for comparing said threshold value with the evaluation value of each of said blocks, to determine if the reduced image of said blocks is set to white or black.

13. The image processing apparatus according to claim 1 in which said executing means includes a control means for causing said image evaluation means and said image determining means to execute their processing operations a given number of times based on the desired reduction factor.

14. The image processing apparatus according to claim 13 in which said control means includes a sequence controller means for executing the processing of the image evaluation by said image determining means a predetermined number of times, said number being determined according to the desired reduction factor in the horizontal direction of the original image while executing the processing of the image evaluation means a predetermined number of times, said number being determined according to the desired reduction factor in the vertical and horizontal directions of the original image.

* * * * *